(12) United States Patent
Farag et al.

(10) Patent No.: US 6,513,544 B1
(45) Date of Patent: Feb. 4, 2003

(54) COMPRESSOR VALVE ARRANGEMENT

(75) Inventors: Nabil Habib Farag, Craigie (AU); David Robert Bowden, Heathbridge (AU)

(73) Assignee: Orbital Engine Company (Australia) Pty Limited, Balcatta (AU)

(*) Notice: Subject to any disclaimer, the term of this patent is extended or adjusted under 35 U.S.C. 154(b) by 0 days.

(21) Appl. No.: 09/636,749

(22) Filed: Aug. 11, 2000

(30) Foreign Application Priority Data

Aug. 13, 1999 (AU) ................................. PQ2214

(51) Int. Cl.[7] ............................................. F16K 15/00
(52) U.S. Cl. .................. 137/512.15; 137/854; 137/856; 418/15
(58) Field of Search .................. 137/512.15, 512.1, 137/512.3, 856, 854; 418/15

(56) References Cited

U.S. PATENT DOCUMENTS

| | | | | |
|---|---|---|---|---|
| 2,725,183 A | * | 11/1955 | Hanson .................. 137/512.15 |
| 4,195,660 A | * | 4/1980 | Taipale et al. .......... 137/856 X |
| 4,325,680 A | * | 4/1982 | Bar .................... 137/512.15 X |
| 4,730,996 A | | 3/1988 | Akatsuchi et al. |
| 4,881,879 A | * | 11/1989 | Ortiz .......................... 417/312 |
| 4,884,956 A | * | 12/1989 | Fujitani et al. ................ 418/15 |
| 4,955,797 A | * | 9/1990 | Cowen ......................... 418/15 |
| 4,973,230 A | * | 11/1990 | Costa .......................... 417/312 |
| 5,004,408 A | * | 4/1991 | Costa .......................... 418/15 |
| 5,035,050 A | * | 7/1991 | Cowen ..................... 29/888.02 |
| 5,073,146 A | * | 12/1991 | Beck .......................... 417/571 |
| 5,104,297 A | * | 4/1992 | Sekiguchi et al. ........ 417/410.3 |
| 5,203,679 A | * | 4/1993 | Yun et al. .................... 417/312 |
| 5,605,447 A | * | 2/1997 | Kim et al. ................... 417/312 |
| 5,863,190 A | * | 1/1999 | Yamamoto et al. ......... 418/55.1 |

FOREIGN PATENT DOCUMENTS

WO    WO 97/27402 A    7/1997

* cited by examiner

*Primary Examiner*—John Rivell
(74) *Attorney, Agent, or Firm*—Arent Fox Kintner Plotkin & Kahn PLLC

(57) ABSTRACT

A compressor valve comprising at least one valve port opening and a flexible valve member located over the at least one valve port for controlling gas flow therethrough, wherein the compressor valve is adapted to cause elements of the valve member to vibrate at least substantially out of phase during operation of the compressor valve.

34 Claims, 5 Drawing Sheets

Fig 1.
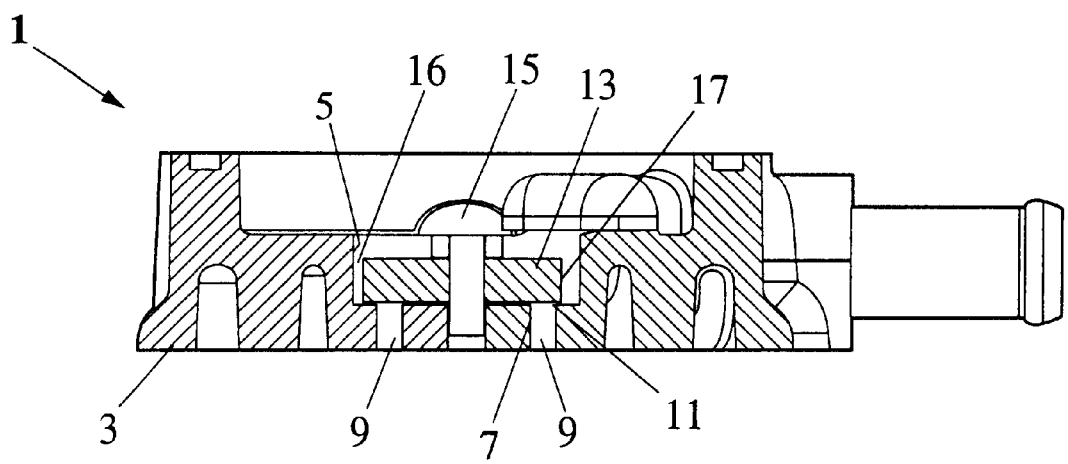
Fig 2a.
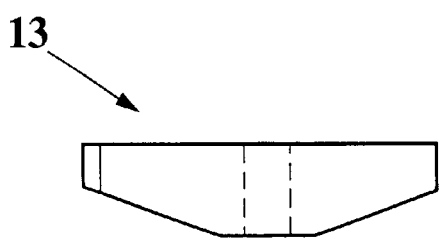
Fig 3a.
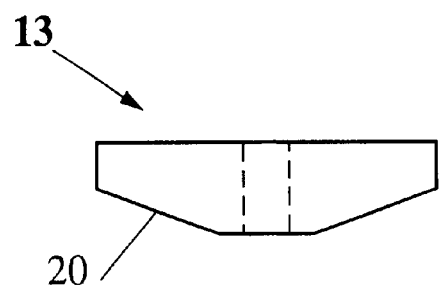
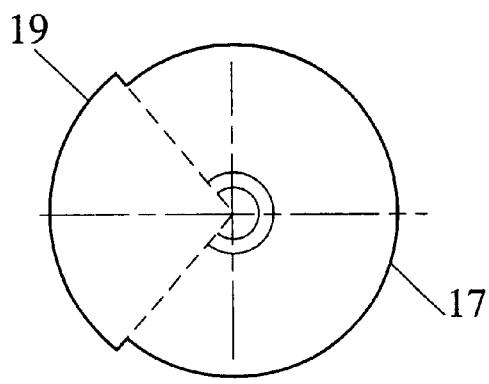
Fig 2b.
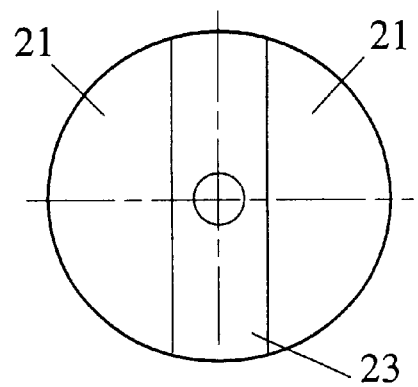
Fig 3b.

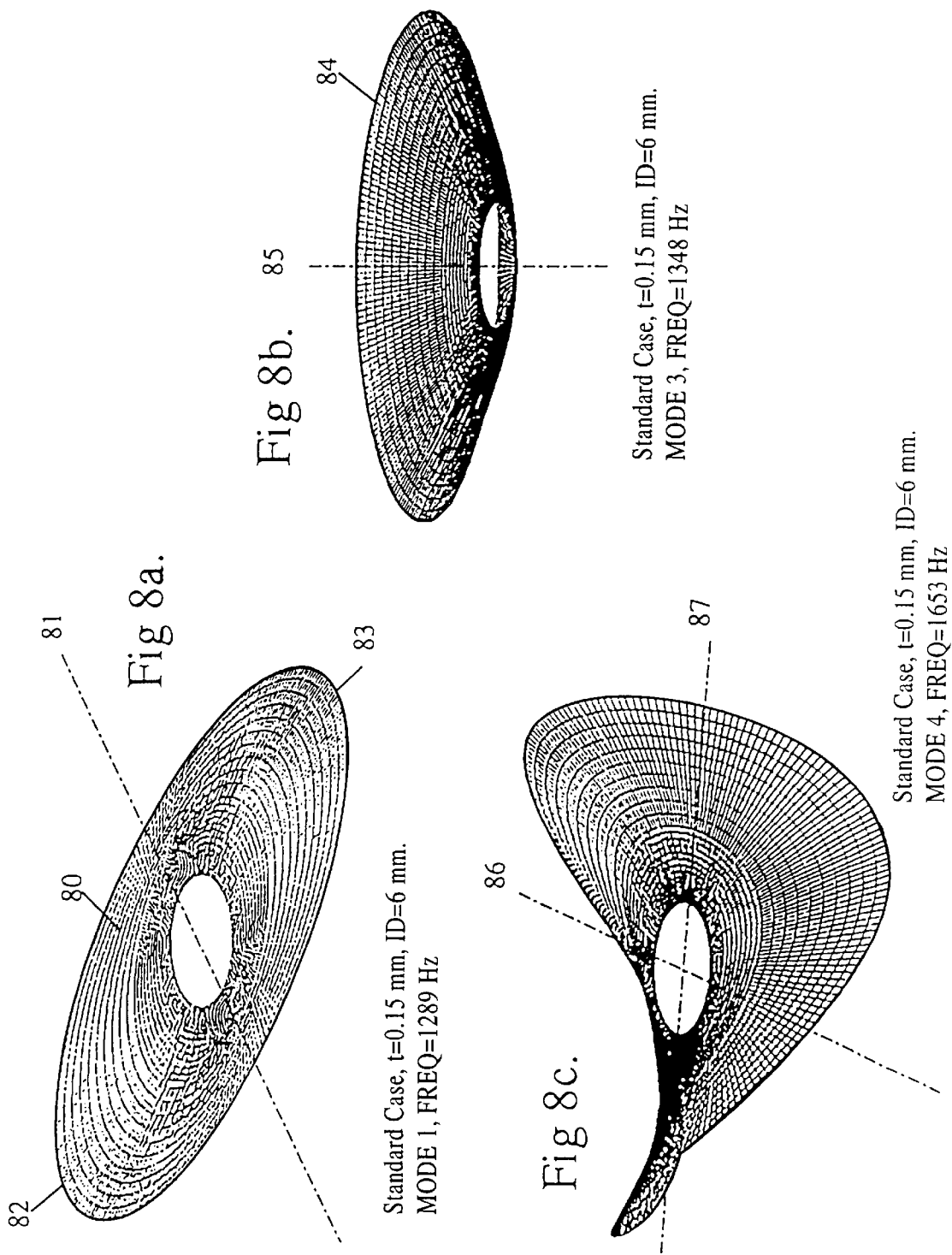

COMPRESSOR VALVE ARRANGEMENT

BACKGROUND OF THE INVENTION

Field of the Invention

The present invention is directed to compressor valve arrangements, and is particularly applicable to gas compressors which are used on or with internal combustion engines. The present invention will in the main be described with respect to compressor discharge valves. It is however to be appreciated that the invention is also applicable to compressor intake valves.

Compressor valves generally control the flow of to and from the compression chamber of a compressor. Compressor valves of the type having a flexible valve member in the form of a valve disc or a series of valve petals are commonly used as intake and discharge valves in small capacity compressors. The single flexible valve disc, flexible valve petals, or any other flexible valve arrangement close off a number of intake or discharge ports in a seat or valve plate of the compressor valve. Compressed gas exits though the discharge ports and is admitted through the intake ports by deflecting the valve member away from the ports.

The periodic deflection of the valve member due to the operation of the compressor causes the valve member to vibrate in different modes. Under certain conditions, the vibration of the valve member can generate a significant amount of noise. For example, where the compressor is a gas compressor for supplying pressurised air to a dual fluid fuel injection system of an internal combustion engine, the discharge valves are often a source of an annoying high pitched "chirping noise" during low speed operation of the compressor. Where the compressor is driven off a crankshaft of the engine, this typically equates to idle and low speed engine operation and as such may be particularly objectionable to the operator.

Where the valve member is a single flexible disc or plate, it has been found that when the member is vibrated in an axi-symmetric mode, it can be idealized as a monopole sound source which is an efficient sound radiator. In this mode of vibration, different elements of the surface of the member vibrate together at least substantially in phase. Therefore, the pressure waves produced by the different elements of the member reinforce each other as they are in phase. A similar effect occurs where the valve member includes a series of valve petals when the petals vibrate together at least substantially in phase thereby also behaving as an efficient sound radiator. The vibration of the valve member in the above described manner can result in the generation of sound at relatively high levels and at particular frequencies.

The sound produced by the vibration of the valve member is however significantly reduced when, in the case of the flexible disc, the various areas of the disc are vibrating in a non-axi-symmetric mode, with the disc surface separated into areas moving at least substantially out of phase with respect to each other. In this mode of vibration, the valve disc can be idealised as a dipole sound source which is an inefficient sound radiator. This is because the pressure waves produced by the vibration of the various elements of the disc area generally cancel each other out when they are out of phase. A similar effect occurs where the valve member includes a series of valve petals when the petals do not vibrate in phase.

As the noise generated by a vibrating valve member can be particularly annoying to people close to the compressor, and may contribute to increasing the overall noise level of the compressor and/or the machine or engine to which it is operatively connected, it would be advantageous to be able to minimise or eliminate such noise.

SUMMARY OF THE INVENTION

It is therefore an object of the present invention to reduce or eliminate noise generated by a compressor valve due to valve member vibration.

With this in mind, according to the present invention, there is provided a compressor valve comprising at least one valve port opening and a flexible valve member located over the at least one valve port for controlling gas flow therethrough, wherein the compressor valve is adapted to cause elements of the valve member to vibrate at least substantially out of phase during operation of the compressor valve.

The elements of the valve member may be constituted by a plurality of individual valve portions which are joined or which together define the valve member. Alternatively, the valve member may be a single structure wherein the elements thereof are constituted by different points of the surface of said structure. Accordingly, where the valve member comprises a plurality of individual valve elements, the compressor valve may be adapted to cause these separate valve elements to vibrate substantially out of phase with respect to each other. Alternatively, where the valve member is a single structure, the compressor valve may be adapted to cause different elements of the surface of said structure to vibrate substantially out of phase with respect to each other.

The out of phase movement of the valve member may be induced by modifying or controlling the airflow around the vibrating valve member. As one possibility, the nature of the forcing air which acts to urge the valve member off its seat may be modified by way of the design and configuration of the ports and any associated passages which deliver air to the valve member. As an alternative possibility, the nature of the cushioning air or effect which acts on the other side of the valve member may be modified in a manner which results in the elements of the valve member vibrating at least substantially out of phase with respect to each other.

In yet a further alternative possibility, the physical characteristics of the valve member or the means by which it is operatively retained could be selected such as to induce the out of phase vibration of elements of the valve member. Such characteristics may include the shape, construction and/or properties of the valve member.

For example, the valve member may comprise elements of varying stiffness such that the elements of the valve member vibrate with different phases with respect to each other during operation of the compressor valve. Alternatively, separate means may be provided to vary the stiffness distribution in different elements of the valve member.

Alternatively, the valve member may be mounted in a manner so as to limit the movement of some of the elements of the valve member such that they are forced to vibrate at least substantially out of phase with respect to one another by virtue of the air flow through the compressor valve.

It is also envisaged that the compressor valve may include a combination of the above described features to induce phase difference in the vibration of the elements of the valve member. Hence, the compressor valve arrangement is effectively preventing the occurrence of the modes of vibration which are efficient at radiating sound and/or supporting those modes of vibration which are inefficient at radiating sound and which will hence promote sound cancellation and the elimination or reduction of noise generation.

Conveniently, the valve member may be in the form of a single flexible disc or any other planer element, such as a rectangular plate. Alternatively, the valve member may comprise a plurality of valve petals. The compressor valve may be of the type where the valve member is located in a gap provided between a valve seat or valve plate and a guide member.

According to a preferred embodiment of the present invention, the compressor valve may include a flexible valve disc, a valve seat, and a guide member, the valve disc being supported at a central portion thereof within a gap provided between the valve seat and the guide member, the valve seat having at least one port extending therethrough, the valve disc closing off the at least one port, wherein the at least one port is located relative to areas of the disc such that the areas of the valve disc are adapted to vibrate at least substantially out of phase with respect to each other during operation of the compressor valve.

A single port may be located eccentrically relative to the centre of the valve disc. It is also envisaged that a plurality of ports may be provided radially about the central portion of the valve disc along a portion of the periphery of the valve disc. Alternatively, the radially located ports may be staggered in a non-uniform manner about the central portion of the valve disc and/or may be of non-uniform size.

As a result, as the compressed air or other gas produced by the compressor exits through the port(s) to deflect the valve disc when in use, a non axi-symmetric pressure force is applied to the valve disc. The different areas or elements of the valve disc therefore vibrate at least substantially out of phase with respect to one another due to the difference in pressure applied to different areas of the valve disc.

According to another preferred embodiment of the present invention, the compressor valve may include a flexible valve disc, a valve seat, and a guide member, the valve disc being supported at a central portion thereof within a gap provided between the valve seat and the guide member, the valve seat having at least one port extending therethrough, the valve disc closing off the at least one port, wherein the guide member is located within the compressor valve to thereby define a flow path through the compressor valve leading to a non axi-symmetric gas flow across the valve disc when the compressor valve is in use such that areas of the valve disc are adapted to vibrate at least substantially out of phase with respect to each other during operation of the compressor valve.

Preferably, the guide member may block off at least a portion of a peripheral gap provided around the periphery of the guide member. Alternatively, the guide member may have a face facing or bearing upon the valve disc, wherein the guide member can abut and prevent movement of a section of the valve disc to thereby physically prevent an axi-symmetric mode of movement of the valve disc.

According to a further preferred embodiment of the present invention, the compressor valve may include a valve member having a series of flexible valve petals, a valve seat and a guide member, the valve petals being located within a gap provided between the valve seat and the guide member, each valve petal closing off a respective port of the valve seat, the guide member having an aperture respectively located over at least one of the valve petals wherein the gas flow across each valve petal is thereby caused to force the valve petals to vibrate at least substantially out of phase with respect to each other.

Conveniently, an aperture may be located over each valve petal. Therefore, each aperture may be located in a non-symmetric manner relative to a central elongate axis of the associated valve petal. The effect of the non-symmetric or eccentric placement of the aperture is to provide an uneven cushioning effect on the petal when there is gas flow through the compressor valve, the uneven or offset cushioning effect resulting in a twisting of the valve petal rather than an even lift off the valve seat. This effect may also be achieved by providing a valve member having valve petals which are eccentric or non-symmetric in shape relative to any main axis thereof. These arrangements assist in preventing any in phase vibration of the valve petals.

According to a yet another preferred embodiment of the present invention, the compressor valve may include a valve member having a series of flexible valve petals, a valve seat and a guide member, the valve petals being located within a gap provided between the valve seat and the guide member, wherein stiffness of the valve petals may be made to vary such that the natural frequencies of the valve petals are caused to differ, the valve petals thereby vibrating with a phase difference with respect to each other.

Preferably, the compressor valve may include a spacer located between the valve member and the guide member. The spacer may have a series of fingers of varying length, each finger being operatively arranged over a respective valve petal to thereby vary the stiffness of the petal. That is, the effective stiffness of the valve petal typically increases with increasing length of the associated finger. Accordingly, this provides for different natural frequencies for each of the petals of the valve member and hence the petals are induced to move with different phases with respect to one another.

Alternatively, the effective stiffness of the individual valve petals may be made to differ by providing petals of different widths, shapes or configurations.

According to a further aspect of the present invention, there is provided a compressor valve comprising at least one valve port and a valve member for opening and closing said port under fluid pressure, said valve member constructed so as to, in operation, vibrate with self attenuating noise characteristics.

The self attenuating noise characteristics may comprise vibration of said valve member in a non-symmetric mode. This non-symmetric mode may comprise a non-axi-symmetric mode.

In the above described compressor valve, the valve member may comprise a flexible disc having an axis, said disc being anchored relative to at least one valve port about said axis whereby, in operation, peripheral edges of said disc open and close said port. At least a portion of said peripheral edge may be anchored relative to said valve port. Alternatively, the peripheral edge may be anchored relative to said valve port along an axis of said disc. The disc may be anchored by a guide member.

In an alternative arrangement in the above described compressor valve, the valve member may comprise an elongate member having first and second ends, said valve member being cantilevered relative to a valve port at, or near, said first end thereof whereby, in operation said second end of said valve member operates to open and close said valve port. The valve member may vibrate, in operation, about an elongate axis thereof.

In all of the described embodiments, the various elements of the valve member are forced to vibrate out of phase or at least with a phase difference with respect to each other. This results in a cancellation effect on the pressure waves generated by the vibration of the elements of the valve member. The result is that the compressor valve according to the present invention is significantly quieter than known compressor valves having flexible valve members.

BRIEF DESCRIPTION OF THE DRAWINGS

It will be convenient to further describe the invention with respect to the accompanying drawings which illustrate some preferred embodiments of the present invention. Other arrangements of the invention are possible, and consequently, the particularity of the accompanying drawings is not to be understood as superseding the generality of the preceding description of the invention.

In the drawings:

FIG. 1 is a side cross-sectional view of a first possible arrangement of the compressor valve according to the present invention;

FIGS. 2a and 2b are side and plan views respectively of a guide member for the compressor valve of FIG. 1;

FIGS. 3a and 3b are side and bottom views respectively of an alternative guide member for the compressor valve of FIG. 1;

FIGS. 8a to c are diagrammatic representations of a disc valve member vibrating in different modes.

DETAILED DESCRIPTION OF THE INVENTION

Figure 4:
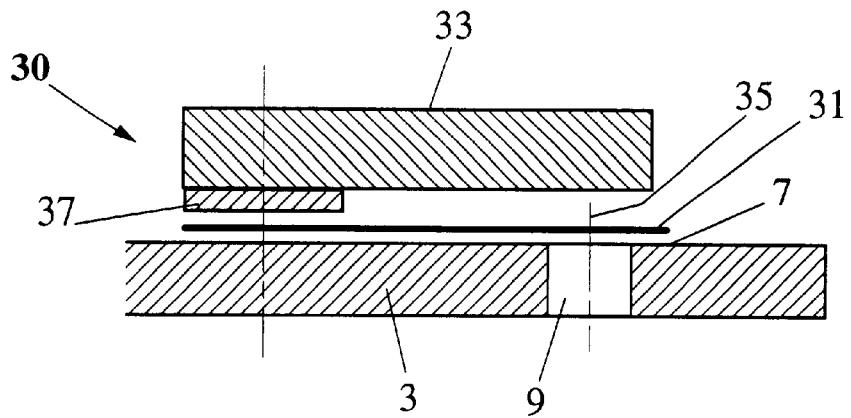
FIG. 4 is a partial side cross-sectional view of another possible arrangement of a compressor valve according to the present invention.

Referring initially to FIG. 1, the compressor valve 1 includes a main body 3 having a generally cylindrical cavity 5 therein. The base of this cavity 5 provides a valve seat 7 of the compressor valve 1. Discharge ports 9 extend through the main body 3 to the valve seat 7. Located over the valve seat 7 is a flexible valve disc 11 which is located over and normally closes off each of discharge ports 9. A guide member 13 is located over the valve disc 11, with a gap being provided between the valve seat 7 and guide member 13 for accommodating and allowing movement or flexing of the valve disc 11. A fastener in the form of a bolt extends through the guide member 13 and through the centre of the valve disc 11 to hold both the guide member 13 and the valve disc 11 in position with respect to the valve seat 7. During operation of the compressor, compressed gas passes through the discharge ports 9 during a compression stroke thereof. The pressure of the gas flow urges areas or elements of the valve disc 11 located over the discharge ports 9 away from the valve seat 7 to allow the discharge of compressed gas past the valve disc 11 and guide member 13.

In conventional compressor valve arrangement of the type shown in FIG. 1, the discharge ports 9 are spaced uniformly in a circle within the valve seat 7 beneath the valve disc 11. Therefore, the compressed gas passing through these ports 9 provides uniform pressure around the edge of the disc 11 and generally causes an even lift of the edge of the disc 11 off the valve seat 7. This can result in the valve disc 11 vibrating in an axi-symmetric mode. The valve disc 11 therefore has each of the elements of the surface thereof moving in phase with one another and acts as a monopole sound source which is an efficient sound radiator. This can result in significant noise production by the compressor valve 1.

One preferred embodiment according to the present invention to alleviate or reduce this undesirable noise is to provide discharge ports 9 along only a portion of, or in a non-uniform manner about, the periphery of the valve disc 11 such that there is non axi-symmetric gas flow through the discharge ports 9. That is, some of the elements of the surface of the disc 11 are made to vibrate out of phase, or with a different phase, as compared to other elements of the surface of the valve disc 11.

Another preferred embodiment of the present invention to alleviate or reduce the undesirable noise is to provide a modified guide member 13. It should be noted that, hereinafter, the same reference numeral is used for corresponding features in each of the figures for the purpose of clarity. FIGS. 2a and 2b show one possible modification of the guide member 13 according to the present invention. The guide member 13 typically has a circular peripheral wall 17. The guide member 13 when located in the cylindrical cavity 5 of the compressor valve body 3 therefore defines a gap 16 between the guide member peripheral wall 17 and the cylindrical cavity 5. That is, airflow through the discharge ports 9 will cause the valve disc 11 to deflect towards the guide member 13 and flow to an outlet of the compressor (not shown) via this gap 16.

The modification of the guide member 13 according to the present invention is the provision of an arcuate extension 19 to the guide member 13. The arcuate extension 19 effectively blocks off a portion of the gap 16 provided between the cylindrical cavity 5 and the guide member 13. The gap 16 is therefore generally annular in shape, with a portion blocked off by the arcuate extension 19. The result of this gap shape is that the gas flows in a non axi-symmetric manner across the valve disc 11, as desired.

An alternative modification of the guide member 13 is shown in FIGS. 3a and 3b. Conventional guide members 13 typically provide a subtle frusto conical bottom surface adjacent the valve disc 11. This provides clearance for the movement or flexing of the valve disc 11. In the modified guide member 13 shown in FIGS. 3a and 3b, the bottom surface 20 of the guide member 13 includes two opposing inclined faces 21 and a central flat face 23 extending diametrically across the bottom face 20 thereof. This flat face 23 abuts the valve disc 11 when the compressor valve 1 is assembled. Accordingly, movement of the area of the valve disc 11 in contact with the flat face 23 of the guide member 13 is thereby prevented. The valve disc 11 can then only vibrate in a non axi-symmetric mode as it is physically prevented from vibrating in an axi-symmetric mode.

Figure 5A:
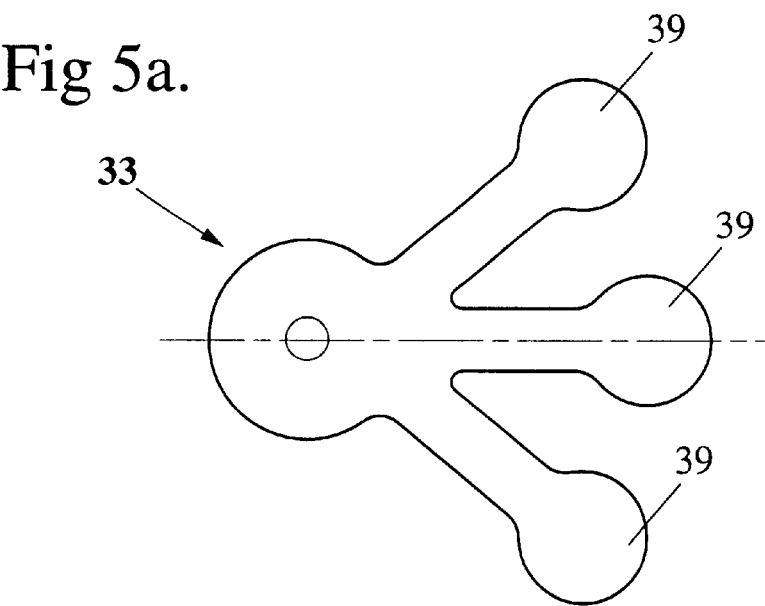
FIGS. 5a and 5b are top and cross-sectional side views respectively of a guide member for the compressor valve of FIG. 4.
Figure 5B:
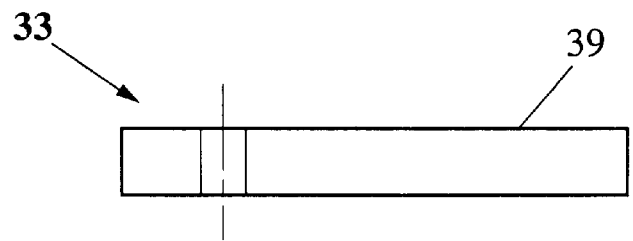

FIG. 4 shows a second preferred embodiment of a compressor valve 30 according to the present invention. This compressor valve 30 also includes a valve body 3 providing a valve seat 7 for a valve member 31. The body 3 is typically in the form of a valve plate to which the valve member 31 is operatively connected. A series of discharge ports 9 extend through the valve body 3 and the valve member 31 normally closes off the various discharge ports 9. A guide member 33 is located over the valve member 31. As best seen from FIGS. 5a and 5b, the valve member 31 is of the same general shape as the guide member 33 which is located over the valve member 31 when the compressor valve 30 is assembled. The valve member 31 therefore has three valve petals extending from a central hub portion. The guide member 33 similarly provides a plurality or series of fingers 39 located over and having the same general shape as the underlying valve petals of the valve member 31. The valve member 31 is located between the valve body 3 and the guide 33 in a gap 35. Also shown in FIG. 4 is a spacer member 37 which is located between the valve member 31 and the guide member 33. As the valve member 31 is anchored at one end only to the valve body 3, it can be regarded as a cantilevered valve member. Typically such cantilevered members are elongate, having a longitudinal axis extending in a direction perpendicular to their plane of cantilever. Such cantilevered valve members may vibrate about their plane of cantilever, or they may also vibrate about their longitudinal axis. By vibrating about their longitudinal axis an individual valve member can exhibit self attenuating noise characteristics.

Where a compressor has a number of elongate cantilevered valve members that vibrate about their elongate axis, the self attenuating noise characteristics of any one valve member may operate independently of the sound waves produced by other valve members within the compressor. Hence the need to construct the compressor so that the individual valve members operate with a phase shift with respect to each other, or operate so as to minimise the occurrence of constructive interference between the valve members is reduced.

Figure 6:
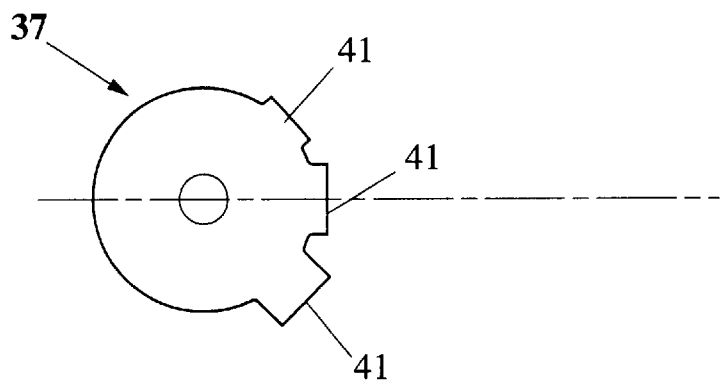
FIG. 6 is a top view of a spacer member for the compressor valve of FIG. 4.

FIG. 6 shows in more detail the spacer member 37 shown in FIG. 4. The spacer member 37 includes a number of fingers 41. These fingers 41 are respectively located over each of the valve petals of the valve member 31 and beneath each of the fingers 39 of the guide member 33. The provision of these fingers 41 urge the associated valve petal against the valve seat 7 which effectively modifies the stiffness and therefore the natural frequency of the associated valve petal. The longer the finger, the higher the stiffness of the valve petal. Therefore, because the valve petals have different natural frequencies,, each valve petal will therefore vibrate with a different phase with respect to the other valve petals when there is gas flow through the discharge ports 9 displacing the valve petals. The spacer 37 may of course in certain applications be formed as part of or integral with the guide member 33.

A similar effect may also be achieved by way of the physical properties and/or characteristics of the valve member 31 itself. For example, the materials of each petal of the valve member 31 may be slightly different such that each petal has a different stiffness. Alternatively, the shapes or configuration of each petal may be different to provide a similar effect.

Figure 7A:
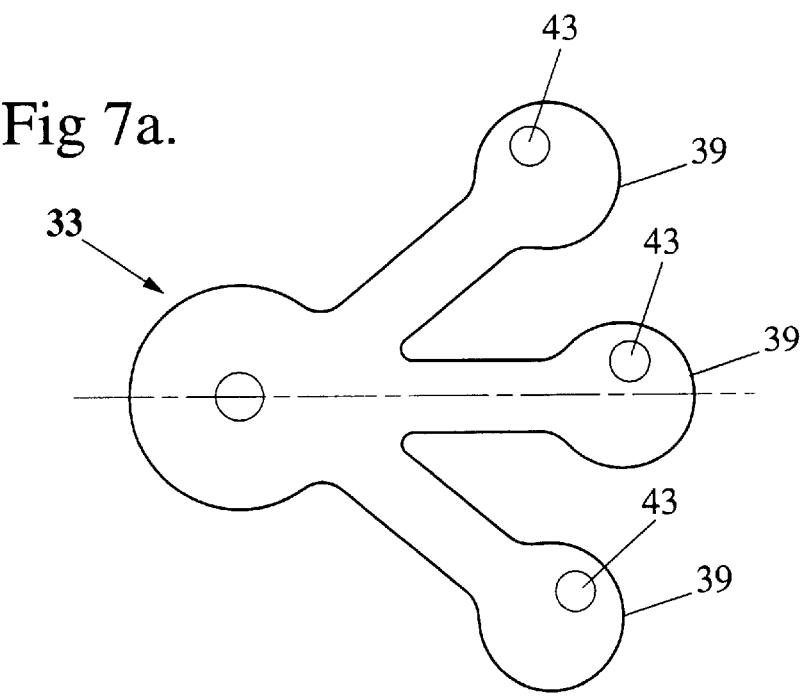
FIGS. 7a and 7b are a top view and a cross sectional side view of an alternative guide member for a compressor valve according to the present invention.
Figure 7B:
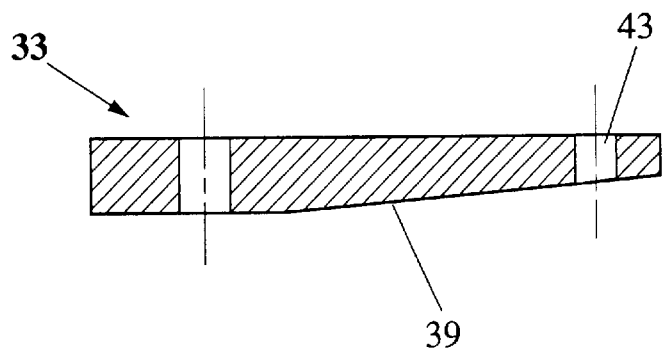

FIGS. 7a and 7b show an alternative preferred embodiment of the guide member 33 shown in FIG. 4. Each finger 39 is provided with an aperture 43 located in a non-symmetric manner or eccentrically relative to the central elongate axis of each finger 39. The provision of this aperture 43 modifies the cushioning effect or the gas reaction forces acting on the valve member 31 such that the gas flow through the discharge port 9 acts to twist the valve petals about their elongate axes. The elements on the surface of each valve petal are then forced to vibrate generally out of phase with respect to each other and the valve petal exhibit self attenuating noise properties.

A somewhat similar effect could also be achieved by providing a discharge port 9 with a modified shape such that the airflow therethrough was more prominent on one side of the underside of a valve petal than the other. That is, the forcing airflow acting on the valve member 31 may be altered to provide for non symmetric vibration of the elements on the surface of each valve petal.

Similarly, this could be achieved by having a non-symmetric or eccentric arrangement of 9 of the discharge ports 9 with respect to the or each of the valve petals. Accordingly, with the discharge port 9 offset with respect to a corresponding valve petal, the airflow through the port 9 would be more prominent on one side of the underside of a valve petal than the other. Hence, this would again provide for the desired non-symmetric vibration of the elements on the surface of each valve petal. Still further, a similar effect may be possible by the use of a valve petal having a distinct non-uniform or non-symmetric shape, that is in particular regard to the portion of the valve petal which corresponds to the discharge port 9.

Each of these alternatives with respect to the arrangement show in FIGS. 7a and 7b result in the airflow around the vibrating valve member 31 being modified so that the valve member exhibits self attenuating noise characteristics.

It should be noted that the use of the guide member 33 shown in FIGS. 7a and 7b in the compressor valve 30 shown in FIG. 4 eliminates the need to use the spacer member 37. Of course, the spacer member 37 could also be used in conjunction with the guide member 33 shown in FIGS. 7a and 7b.

FIGS. 8a, 8b and 8c are diagrammatic representations of a disc valve member, clamped on a central circular area 80, vibrating in different modes.

FIG. 8a is a representation of the first mode of vibration for a planar disc 80. It is a non-axi-symmetric mode of vibration with the disc 80 pivoting about a diametral axis 81 that lies in the plane of the disc 80 and that passes along a diameter of the disc 80. Edge portions 82 and 83 pivot in anti-phase with respect to each other about the diametral axis 81. This results in sound waves radiating from the surface of the disc 80. The first half of the disc 80 may be designated as being that portion of the disc 80 that includes the diametral axis 81 and edge portion 82. The second half the disc 80 may be designated as that being that portion of the disc 80 that includes the diametral axis 81 and the edge portion 83. As the two halves of the disc vibrate in anti-phase the sound waves that radiate from the surface of corresponding elements of the respective halves of the disc are also in anti-phase. The result is a reduction in sound levels emitted from the disc which in turn reduces noise produced by the compressor.

FIG. 8b is a representation of an axi-symmetric mode of vibration, it corresponds to the third mode of vibration for a planer disc. The peripheral edge 84 of the disc vibrates about an axis 85 that passes through the centre of the disc at an angle that is normal to the disc. As all of the elements of the surface of the disc vibrate in phase, sound waves are produced from the surface of the disc that reinforce one another, causing the disc to efficiently radiate sound.

FIG. 8c corresponds to the fourth mode of vibration for a planer disc. It has a first diametral axis of vibration 86 and a second diametral axis of vibration 87 which causes the disc to form a saddle shape. In this mode of vibration, the disc again produces sound waves from its surface. The sound waves from different elements of the surface are in anti-phase with sound waves from corresponding elements on other portions of the surface.

Accordingly it can be seen that a single valve member can be configured so as to vibrate with, in part, self cancelling noise properties.

Figure 9A:
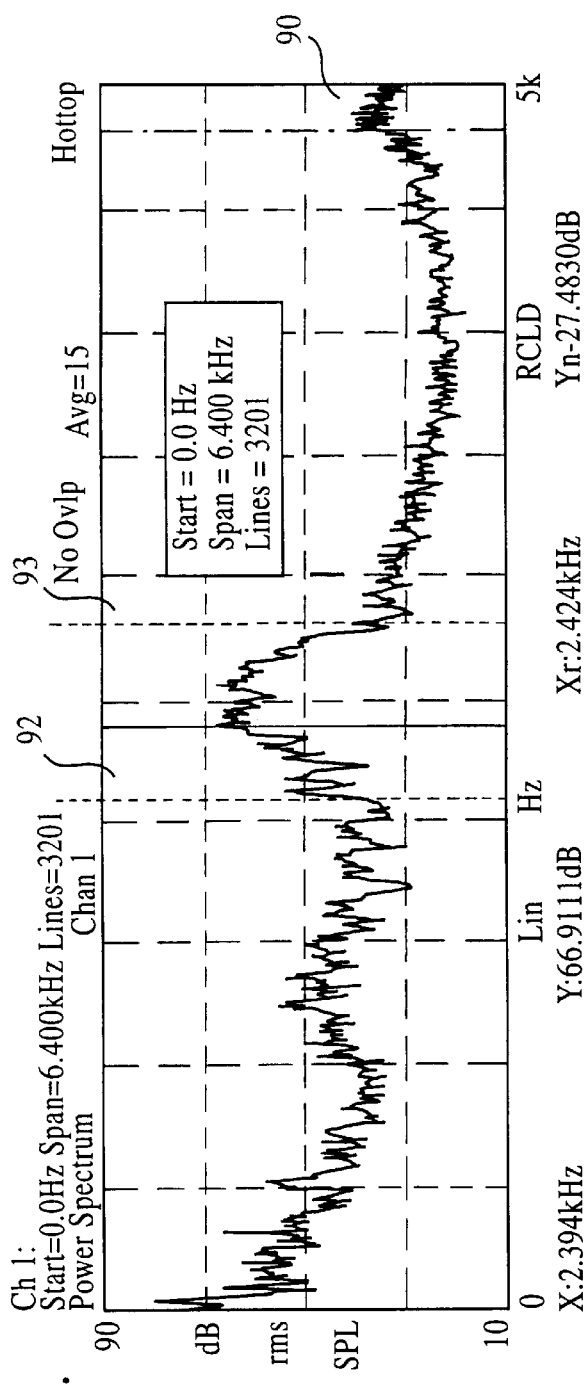
FIGS. 9a and b are respectively graphs showing experimental results obtained by the Applicant.
Figure 9B:
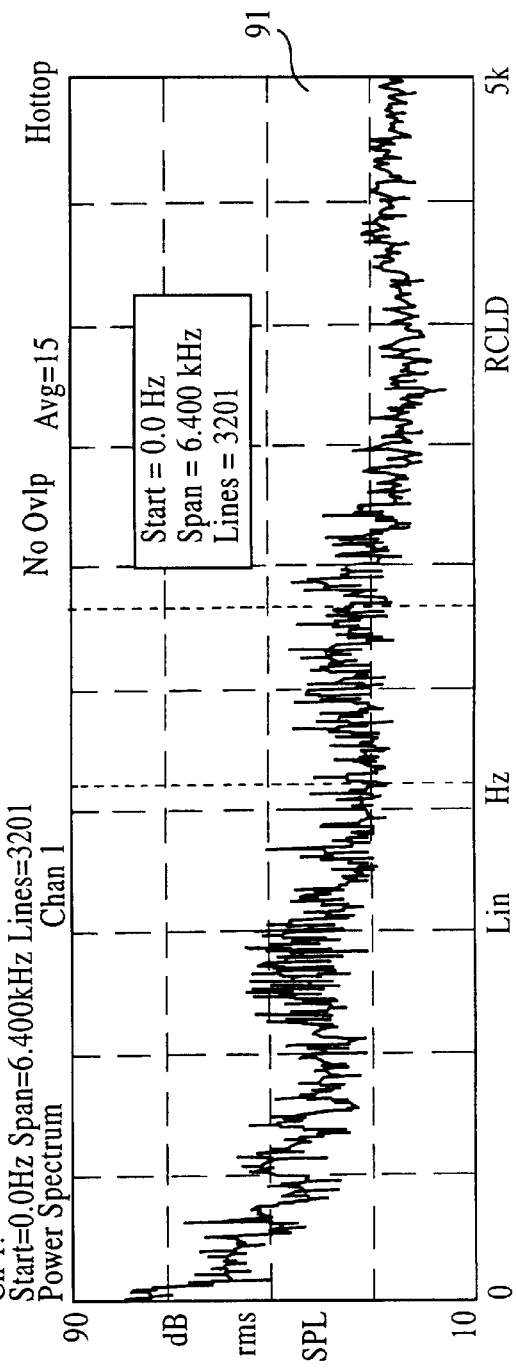

FIGS. 9a and 9b are the results of experiments performed by the applicant on a compressor used in the applicants air assisted direct fuel injection system for internal combustion engines. An example of such a fuel system may be found in the applicants U.S. Pat. No. 4,693,224 and U.S. Pat. No. RE 36768 and PCT patent application No. PCT/AU98/01004 all of which are incorporated herein by reference.

FIG. 9a shows a power spectrum sweep 90 between 0 Hz and 6.4 kHz (truncated at 5 kHz for present purposes) for one of the applicants disc valve compressors operating in an axi-symmetric mode. Lines 91 and 92 define a region in the spectrum 90 having significant levels of audible noise compared to the remainder of the spectrum 90.

FIG. 9b shows a power spectrum sweep 91 between 0 Hz and 6.4 kHz (truncated at 5 kHz for present purposes) for the same disc valve compressor, however the disc valve is caused to vibrate with a non-axi-symmetric mode. The region of the spectrum 91, between lines 92 and 93 can be seen to have a significant reduction, of approximately 20 dB, in the level of audible noise generated compared to the same region in FIG. 9a.

In all of the above described preferred embodiments, the elements of the valve member 11, 31, whether the elements are the different areas of the valve disc 11 shown in FIG. 1, the different areas of and individual valve petal as described with respect to FIG. 5, or the different valve petals themselves of the compressor valve 30 shown in FIG. 4, are urged to vibrate out of phase or with different phases with respect to each other. Therefore, the pressure waves produced by the vibrating elements of the valve member 11, 31 tend to cancel each other out as they are not in phase. Hence, this provides an arrangement which supports those modes of vibration which reduce noise generation and thus results in a reduction or elimination of noise that would normally be generated by the vibration of the valve member 11, 31 thereby leading to significantly quieter operation.

The compressor valve arrangements described above are typically used as compressor discharge valves. It should however be noted that the present invention is also generally applicable for compressor intake valves. Modifications and variations as would be deemed obvious to the person skilled in the art are included within the ambit of the present invention as defined in the appended claims.

We claim:

1. A compressor valve comprising at least one valve port opening and a flexible valve member located over the at least one valve port for controlling gas flow therethrough, wherein the compressor valve is adapted to cause elements of the valve member to vibrate at least substantially out of phase relative to other elements of a surface of the valve member during operation of the compressor valve, wherein the valve member is a single structure, the elements of the valve member being constituted by different points of the surface of the valve member and further including means for inducing the out of phase vibration of the valve member by controlling or modifying the gas flow about at least one of said valve member elements, wherein a cushioning effect of the gas on an opposing side of the valve member away from the valve ports induces said out of balance vibration.

2. A compressor valve according to claim 1, wherein the elements of the valve member are individual valve portions, the compressor valve being adapted to cause the valve portions to vibrate at least substantially out of phase during operation thereof.

3. A compressor valve according to claim 2, wherein the valve member includes a plurality of valve petals.

4. A compressor valve according to claim 1, wherein the valve member is in the form of a single flexible disc.

5. A compressor according to claim 1, wherein the valve ports and associated passages are configured such that the gas flow passing therethrough which forces the valve member away from the valve port induces said out of phase vibration.

6. A compressor valve according to claim 1, wherein the physical characteristics of the valve member is adapted to induce said out of phase vibration.

7. A compressor valve according to claim 6, wherein the valve member includes elements of varying stiffness.

8. A compressor valve according to claim 6, including separate means for varying the stiffness distribution in different elements of the valve member.

9. A compressor valve according to claim 6, including mounting the valve member such that the elements thereof are forced to vibrate at least substantially out of phase with respect to one another by virtue of the gas flow through the compressor valve.

10. A compressor valve according to claim 8, wherein the valve member is located between a valve seat and a guide member, wherein said guide member imparts said distribution of varying stiffness to different elements of said valve member.

11. A compressor valve including a flexible valve disc, a valve seat, and a guide member, the valve disc being supported at a central portion thereof within a gap provided between the valve seat and the guide member, the valve seat having at least one port extending therethrough, the valve disc closing off the at least one port, wherein the at least one port is located relative to areas of the disc such that the areas of the valve disc are adapted to vibrate at least substantially out of phase with respect to each other during operation of the compressor valve.

12. A compressor valve according to claim 11, wherein a single said port is located eccentrically relative to the centre of the valve disc.

13. A compressor valve according to claim 11, wherein a plurality of said ports are provided radially about a central portion of the valve disc along a portion of the periphery thereof.

14. A compressor valve according to claim 11, wherein radially located ports are staggered in a non-uniform manner about a central portion of the valve disc.

15. A compressor valve according to claim 13, wherein the ports are of a non-uniform size.

16. A compressor valve comprising a flexible valve disc, a valve seat, and a guide member, the valve disc being supported at a central portion thereof within a gap provided between the valve seat and the guide member, the valve seat having at least one port extending therethrough, the valve disc closing off the at least one port, wherein the guide member is located within the compressor valve to thereby define a flow path through the compressor valve leading to a non axi-symmetric gas flow across the valve disc when the compressor valve is in use such that areas of the valve disc are adapted to vibrate at least substantially out of phase with respect to each other during operation of the compressor valve.

17. A compressor valve according to claim 16, wherein the guide member blocks off at least a portion of a peripheral gap provided around the periphery of the guide member.

18. A compressor valve according to claim 16, wherein the guide member has a face facing or bearing upon the valve disc, wherein the guide member can abut and prevent movement of a section of the valve disc to thereby physically prevent an axi-symmetric mode of movement of the valve disc.

19. A compressor valve comprising a valve member having a series of flexible valve petals, a valve seat and a guide member, the valve petals being located within a gap provided between the valve seat and the guide member, each valve petal closing off a respective port of the valve seat, the guide member having an aperture respectively located over at least one of the valve petals, wherein the gas flow across each valve petal is thereby caused to force the valve petals to vibrate at least substantially out of phase with respect to each other.

20. A compressor valve according to claim 19, wherein the aperture is located in a non-symmetric manner relative to a central elongate axis of the associated valve petal.

21. A compressor valve comprising a valve member having a series of flexible valve petals, a valve seat and a guide member, the valve petals being located within a gap provided between the valve seat and the guide member, each valve petal closing off a respective port of the valve seat, the valve petals being eccentric or non-symmetric in shape relative to a main axis thereof, wherein the gas flow across each valve petal is thereby caused to force the valve petals to vibrate at least substantially out of phase with respect to each other.

22. A compressor valve comprising a valve member having a series of flexible valve petals, a valve seat and a guide member, the valve petals being located within a gap provided between the valve seat and the guide member, wherein stiffness of the valve petals is made to vary such that the resonant frequencies of the valve petals are caused to differ, the valve petals thereby vibrating with a phase difference with respect to each other.

23. A compressor valve according to claim 22, further including a spacer located between the valve member and the guide member, the spacer having a series of fingers of varying length, each finger being operatively arranged over a respective valve petal to thereby vary the stiffness of the petal.

24. A compressor valve according to claim 22, wherein the valve petals are of different widths, shapes or configurations.

25. A compressor valve comprising at least one valve port and at least one valve member moveable relative to said at least one valve port for opening and closing said at least one valve port under fluid pressure, said at least one valve member and said at least one valve port are arranged such that said at least one valve member vibrates in a non-symmetric mode and exhibits self attenuating noise characteristics under said fluid pressure, wherein said valve member comprises a flexible disc having an axis, said disc anchored relative to at least one valve port about said axis wherein, in operation, peripheral edges of said disc open and closed said port.

26. A compressor valve according to claim 25, wherein said non-symmetric mode comprises a non-axi-symmetric mode.

27. A compressor valve as claimed in claim 25, wherein at least a portion of said peripheral edge is anchored relative to said valve port.

28. A compressor valve as claims in claim 25, wherein said peripheral edge is anchored relative to said valve port along an axis of said disc.

29. A compressor valve as claimed in claim 25, wherein said disc is anchored by a guide member.

30. A compressor valve comprising at least one valve port and at least one valve member moveable relative to said at least one valve port for opening and closing said at least one valve port under fluid pressure, said at least one valve member and said at least one valve port are arranged such that said at least one valve member vibrates in a non-symmetric mode and exhibits self attenuating noise characteristics under said fluid pressure, wherein said at least one valve member comprises at least one elongate member having first and second ends cantilevered relative to a valve port at, or near, said first end thereof, wherein during operation said second end of said valve member operates to open and close said valve port, wherein said valve port is located so as to be off-set from an elongate axis of said valve member whereby under fluid pressure said valve member vibrates about said elongate axis.

31. A compressor valve according to claim 30, wherein said valve member vibrates, in operation, about an elongate axis thereof.

32. A compressor valve according to claim 30 further comprising a plurality of elongate members adapted to in use vibrate under fluid pressure and at least one guide means located adjacent said first end of said valve member, the guide means shaped so as to impart a different degree of stiffness to each said valve member.

33. A compressor valve according to claim 32 wherein said guide means comprises a plurality of fingers, each finger having a different length so as to impart said different degree of stiffness to each said valve member.

34. A compressor valve according to claim 32 wherein each said elongate member is of substantially the same length.

* * * * *